United States Patent [19]

Forrest et al.

[11] Patent Number: 5,679,075
[45] Date of Patent: Oct. 21, 1997

[54] INTERACTIVE MULTI-MEDIA GAME SYSTEM AND METHOD

[75] Inventors: Andrew R. Forrest, Everett; Alan J. Pruzan; William J. Moore, both of Seattle, all of Wash.

[73] Assignee: Beanstalk Entertainment Enterprises, Seattle, Wash.

[21] Appl. No.: 554,578

[22] Filed: Nov. 6, 1995

[51] Int. Cl.⁶ ............................................. G06T 131/00
[52] U.S. Cl. .................................................... 463/9
[58] Field of Search ........................... 463/9, 23, 30, 463/31, 35; 434/406

[56] References Cited

U.S. PATENT DOCUMENTS

| | | | |
|---|---|---|---|
| 4,045,031 | 8/1977 | Arnold | 273/134 AT |
| 4,170,358 | 10/1979 | Hancock | 273/304 |
| 4,397,467 | 8/1983 | Thornton | 273/256 |
| 4,428,582 | 1/1984 | Smith | 273/296 |
| 4,588,193 | 5/1986 | Winston | 273/304 |
| 4,957,291 | 9/1990 | Miffitt | 463/9 |
| 4,961,708 | 10/1990 | Van Niekerk | 434/406 |
| 5,205,563 | 4/1993 | Dearing | 273/296 |

OTHER PUBLICATIONS

"i-glasses!," product literature from Virtual i-O, Inc., Seattle, WA, 1995.
"LK-33 3-Dimensional 6-CCD Color Camera," product literature from Ikegami Electronics (U.S.A.), Inc., Maywood, NJ, 1994.
"How the Future is Shaping up in TV Tech," *TV Guide*, Apr. 15-21, 1995.
"Computer Express, Pinup," *HFN* 69(15), Apr. 10, 1995.
"The Source, Seeing Is Believing," *Windows Source*, pp. 28-29, Apr. 1995.
"VR People, Linden Rhoads, Virtual I/O," pp. 34-36, 38-39, The Virtual I/O 'i'glasses!' HMD, pp. 66-68, *VR World*, May/Jun. 1995.
Burr, Ty, "The Visionary Thing," *Entertainment Weekly*, pp. 66-67, Apr. 28, 1995.
Von Schweber, Linda and Erick, "Virtual Reality Virtually Here," *PC Magazine14*(5): 168-169, 198, Mar. 14, 1995.

*Primary Examiner*—George Manuel
*Attorney, Agent, or Firm*—Seed and Berry LLP

[57] ABSTRACT

An interactive, multi-media game system and method is provided. In a preferred embodiment, an audio and/or visual playback system contains portions of a prerecorded narrative stored therein. Teams of players cooperatively solve puzzles, obtain information fragments and directional clues, and ultimately solve an overall meta-puzzle that can be in the context of the narrative. The players move between the portions of the prerecorded narrative and the puzzles that are positioned at selected locations in a defined space. The players solve threshold puzzles to permit them to access, or reaccess, selected portions of the narrative on the audio and/or visual playback device. The players gather sets of information fragments to solve a global meta-puzzle.

28 Claims, 5 Drawing Sheets

DURING YOUR JOURNEY, FIND THE NUMBERED INFO-SQUARES. COPY THE PICTURES EXACTLY AS YOU SEE THEM INTO THE CORRESPONDING BOXES BELOW:

THE IMAGES THAT YOU DREW IN EACH HORIZONTAL ROW CREATE THREE DIFFERENT PUZZLES. SOLVE EACH PUZZLE ACCORDING TO THE INSTRUCTIONS BELOW:

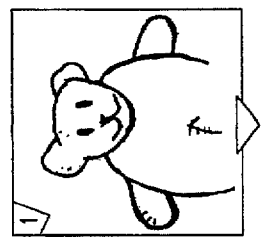 + 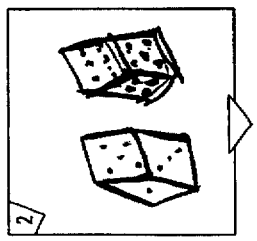 + 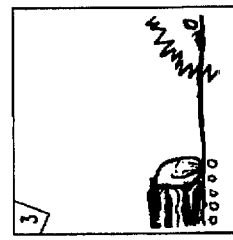 = WHAT NAME DO THE PICTURES IN BOXES 1,4,&7 SHARE? Kennedy ONE WORD ONLY! — 410

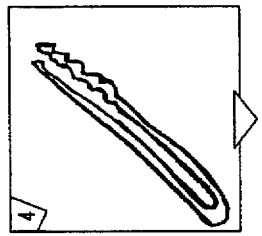 + 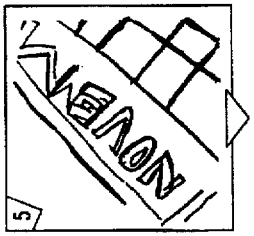 + 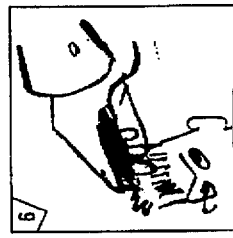 = WHAT NAME DO THE PICTURES IN BOXES 2,5,&8 SHARE? Eleven ONE WORD ONLY! — 412

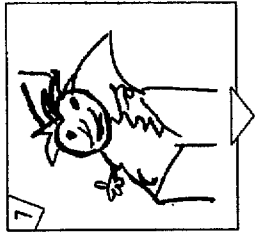 + 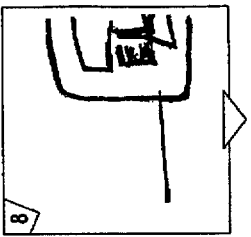 +  = EACH PICTURE IN BOXES 3,6,&9 CONTAINS THIS WORD Buzz ONE WORD ONLY! — 414 guide will validate TIME PORTAL ACCESS CODE —1943#— L29 bonus clue — 408 guide will validate TIME PORTAL ACCESS CODE —1995#— A72 bonus clue — 406 guide will validate TIME PORTAL ACCESS CODE —2024#— 5c87 bonus clue — 404

IMPORTANT USE THE 3 VALIDATION STAMPS TO OBTAIN FINAL CLUE.

IMPORTANT USE THE 3 VALIDATION STAMPS TO OBTAIN FINAL CLUE.

*One small step for mankind.* WRITE THE HIDDEN MESSAGE HERE SHOW IT TO THE GUIDE — 416

Fig. 5

INTERACTIVE MULTI-MEDIA GAME SYSTEM AND METHOD

TECHNICAL FIELD

The present invention relates to the field of multi-media entertainment systems and methods for using such systems by at least one player.

BACKGROUND OF THE INVENTION

Early "multi-media" entertainment systems included audio tours of specific locations, such as art museums. During these audio tours, users or participants carried portable audio playback equipment, such as magnetic tape players having earphones or headphones to listen to a prerecorded audio narrative while viewing works of art. Participants would typically view a particular work while listening to a prerecorded portion of the audio narrative related to that work, stop the tape player, move to a location of the next work in the museum, and then continue listening to the audio narrative which related to the next work. These audio tours provided a more sensory-rich experience within the museum than simply viewing the artworks and reading associated placards.

The audio tours provide a common narrative to each participant for use in a specific location. Certain audio and video programs, prerecorded on magnetic tape for playback in a videotape recorder ("videotapes"), improved on the audio tour format. Instructional, educational, entertainment and other videotapes allowed several users to simultaneously view the video and listen to the audio narratives while interacting with each other. For example, an instructional dance video allowed two or more users to interact with each other and learn to dance while simultaneously viewing/listening to the videotape within their home or at another location.

Certain entertainment video tapes, such as murder mystery party video tape games allowed several users or players to view an initial portion of a videotape which provided them with an initial narrative and set the background for a murder mystery game. Thereafter, the players interacted with each other, often after reviewing individual fact sheets for certain suspects in the game, to further develop the murder mystery plot. After attempting to solve the mystery, the players then viewed a remaining portion of the narrative on the videotape to determine the identity of the true murderer.

Prerecorded videotapes provided a more sensory-rich environment than audio tapes. Today's personal computers can at times provide an even more sensory-rich entertainment experience for players. Because such games are stored on a compact disk read-only memory ("CD ROM"), a high density, "random access" storage format, many interactive computer games allow users to solve puzzles and find clues in a rich narrative and in a non-chronological order to achieve an ultimate goal (e.g., solving a mystery or saving a character in the narrative). Computer games are generally played by only one user on a single personal computer ("PC"). Some computer games, however, allow several PCs, to be interconnected by communication lines to allow two or more users to simultaneously play the game.

CD ROM computer games often include colorful images, including animation and video, and high quality audio, including music, voices and environmental sounds. To enrich the sensory experience of the CD ROM games, players can wear head mounted devices ("HMDs"), which include audio headphones and personal computer displays that fit over a player's ears and eyes. Other forecasted computer peripherals will allow for an even richer sensory environment, or "virtual reality," over standard cathode ray tube ("CRT") displays and speakers typically connected to present day PCs.

CD ROM games require players to sit or be positioned in front of the computer display, even more so than with videotapes. One particular interactive computer game of which the inventors are aware it is conducted by "Virtual World Amusement Centers." Players initially view a prerecorded video orientation program. Thereafter, the players proceed to specified locations, such as booths, each having televisions or PCs, where they each play an interactive video game with or against each other. The interactive video game is similar to computer games known in the art that are played on separate PCs interconnected by communication lines.

The video games conducted at the Virtual World Amusement Centers require players to be positioned either in front of a television screen for the prerecorded video orientation or in front of a computer screen for the video game. The video games conducted at the Virtual World Amusement Centers allows players to interact with each other, while physically separated, to compete against a computer or each other in a typical battle scenario.

SUMMARY OF THE INVENTION

The inventors of the present invention have discovered a need for an interactive multi-media game system and method that allows players to cooperatively solve puzzles, obtain clues, and ultimately solve an overall problem or riddle in the context of a rich narrative as they move between a prerecorded audio and/or visual plot to the various puzzles that are positioned at selected locations in some defined space. As described below, the inventors have developed, under a preferred embodiment, a multi-media game system and method that requires teams of players to collect "information fragments" needed to solve a global or overall "meta-puzzle," while following a prerecorded narrative. The information fragments are preferably collected by following sets of directional clues that lead them to predetermined locations within a defined space where they interact with various physical media or puzzles such as "visual puzzles," "physical tricks" or "performer-based puzzles." Preferably, upon solving a threshold puzzle or gathering one or more predetermined information fragments, the players gain access, or reaccess, to portions of the narrative prerecorded on an audio/visual playback device. As a result, the teams of players alternately interact between a physical media in a defined space and a narrative prerecorded on a storage media.

In a broad sense, the present invention preferably embodies a game system usable by a team of at least two players to solve a meta-puzzle. The system includes an information storage and retrieval device that contains first and second portions of a narrative, the first and second portions providing first and second directional clues, respectively. A human actuatable switch device and an output device are coupled to the information storage and retrieval device. The output device conveys the first and second portions of the narrative and the first and second directional clues, respectively, to at least one of the players in response to preselected first and second actuations of the switch device, respectively. The first and second directional clues provide information that directs at least one player to first and second locations, respectively, in the defined space.

A first puzzle solvable by the players is at the first location. The solution of the first puzzle provides a first information fragment and a threshold clue. The threshold clue provides information regarding the second preselected actuation of the switch device to allow at least one player to access the second portion of the narrative from the information storage and retrievable device. A second puzzle solvable by the players is at the second location. The solution of the second puzzle provides a second information fragment. The game system also includes a meta-puzzle solvable by the players using the first and second, or more, information fragments.

The present invention also preferably embodies a method of solving a meta-puzzle by a player, a solution to the meta-puzzle requiring at least two information fragments. The method comprises the steps of: (a) listening or viewing a first portion of a narrative from a prerecorded storage media, the first portion of the narrative providing a first directional clue that directs the players to a first location; (b) receiving a first information fragment at the first location; (c) gaining access to a second portion of the narrative; (d) listening or viewing a second portion of the narrative, the second portion of the narrative providing a second directional clue that directs the player to a second location; (e) receiving a second information fragment at the second location; and (f) employing the first and second information fragments to solve the meta-puzzle.

The present invention provides a more sensory-rich, interactive game system over those noted above by allowing players to alternately experience prerecorded audio and/or visual media having a narrative, and physical media including visual puzzles, physical tricks and performer-based puzzles located at predetermined positions within some defined space. Those skilled in the art will understand other features and advantages of the present invention from studying the following detailed description of the presently preferred embodiment, together with the following drawings.

BRIEF DESCRIPTION OF THE DRAWINGS

FIG. 5 is an example of a log for recording clues under the game system of the present invention.

DETAILED DESCRIPTION OF THE PRESENTLY PREFERRED EMBODIMENT OF THE INVENTION

The present invention provides, in a preferred embodiment, a system and method of solving puzzles, including threshold puzzles, that allows players to access, or reaccess, and view and/or listen to, portions of a narrative stored on a prerecorded medium. Players solve one or more puzzles in a defined space to obtain directional clues and/or information fragments. Information fragments are used to solve a global meta-puzzle, as explained below. The game system and method of the present invention is adaptable for use in any number of defined spaces, and flexible enough to allow for various types of puzzles and various prerecorded narrative themes.

Figure 1:
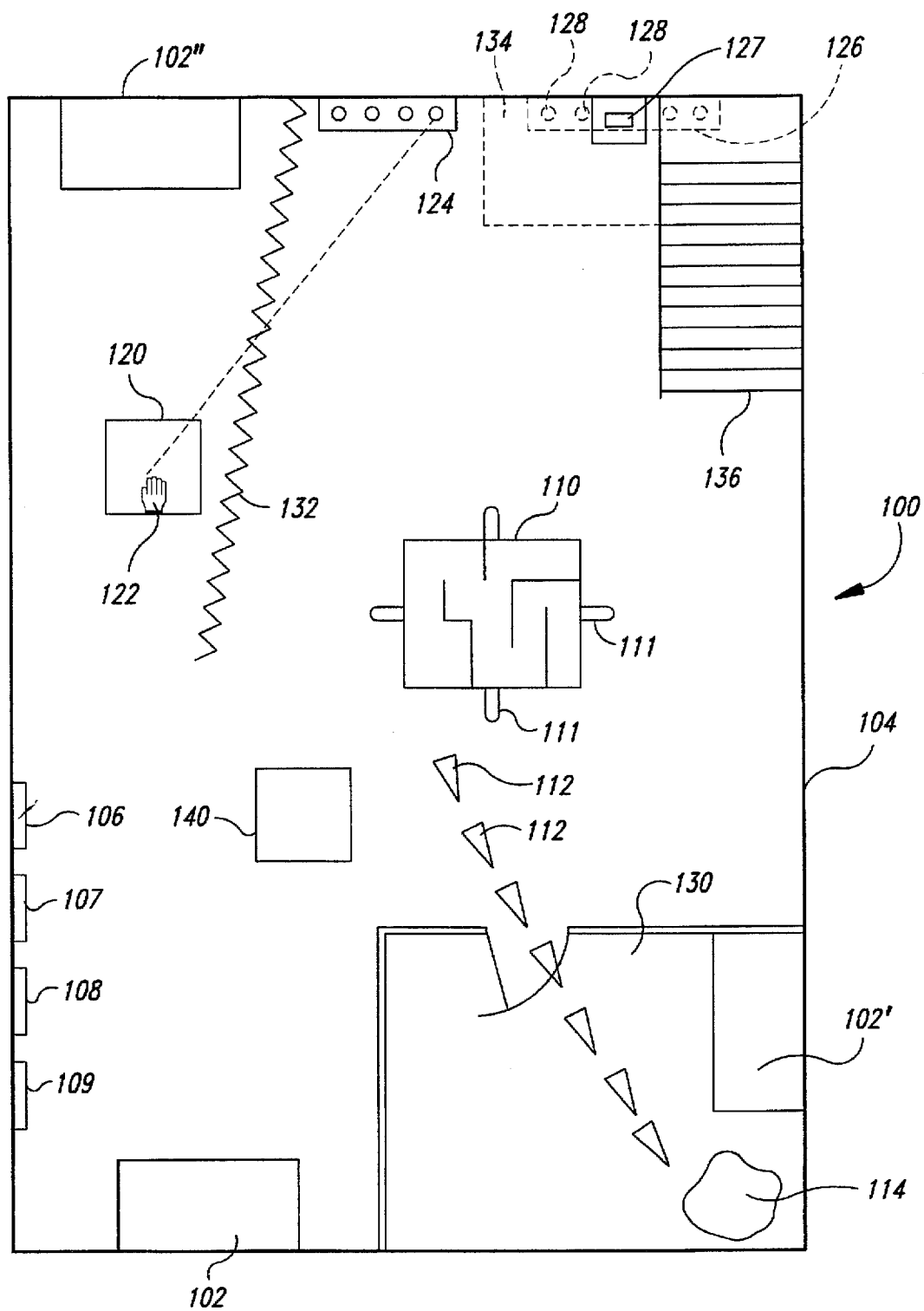
FIG. 1 is a partial block, partial top plan view of a preferred embodiment of the multi-media game system of the present invention positioned within a defined space.

Referring to FIG. 1, a multi-media, interactive game system 100 of the present invention includes one or more audio and/or visual playback systems 102, 102' and 102" located within a defined space 104 such as an outdoor area or one or more rooms in a building. The defined space can also include non-specific areas, such as different nodes in a computerized communication network or sites/pages on the Internet or in "cyberspace." The defined space can also be as small as a single room or as large as a multi-state geographic region (e.g., for a treasure hunt-type theme). As explained more fully below, the audio/visual playback systems 102-102" provide teams of players with portions of a story line or narrative and/or directional clues that direct players to one or more puzzles 106 through 126 as explained more thoroughly below. The puzzles 106 through 126 are positioned at predetermined locations within the defined space 104, and can be within a separate room 130, behind a curtain 132, or in a room 134 beneath or above a current or main room, which is accessible by, for example, stairs 136. An optional guide 140, such as a computer or a person, provides assistance to the players, and can provide important clues or information after certain puzzles are solved, such as access codes or keys that allow the players to access or reaccess portions of the narrative from the audio/visual playback system 102.

Figure 2:
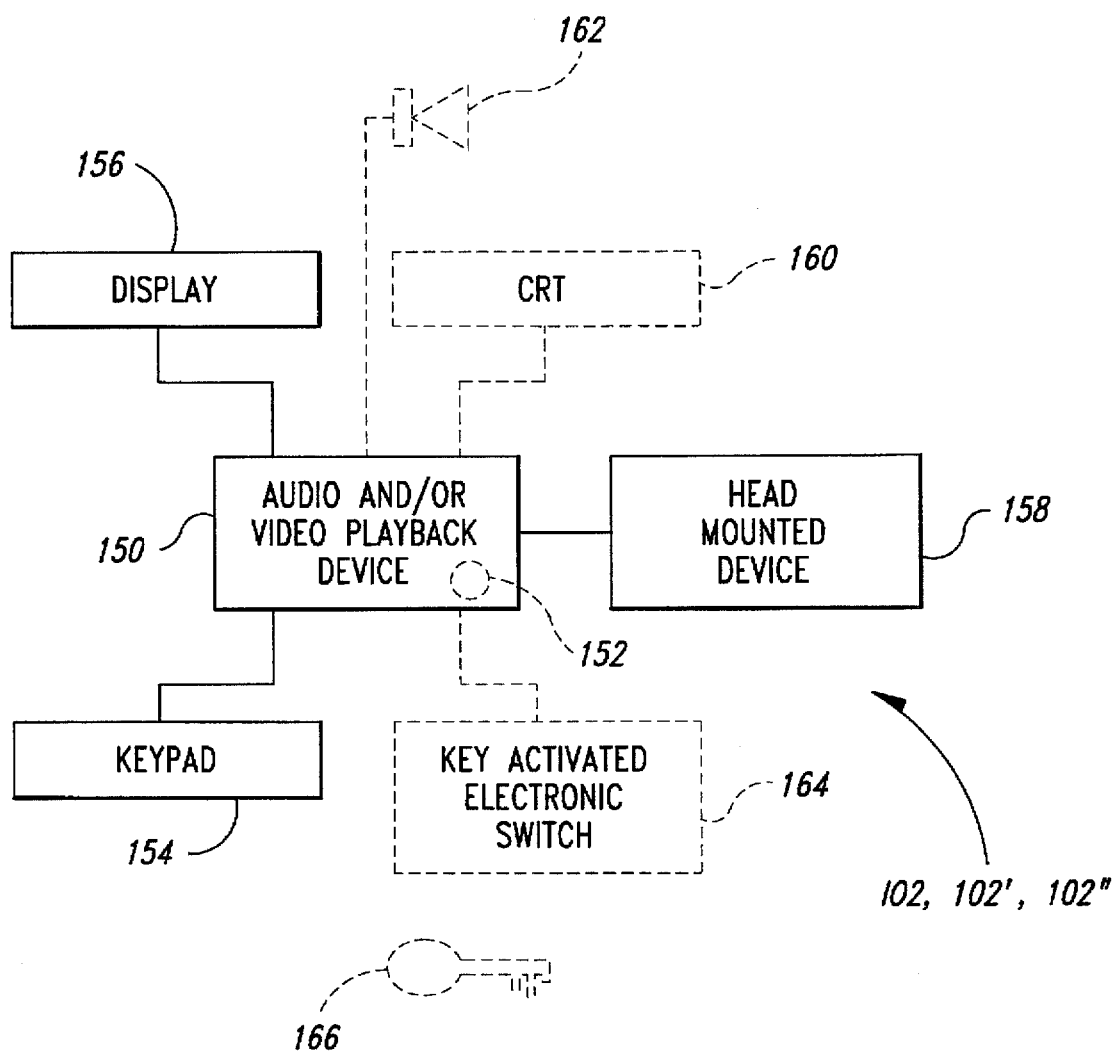
FIG. 2 is a block diagram of a preferred embodiment of an audio/visual playback device for use with the game system of FIG. 1.

Referring to FIG. 2, the one or more audio/visual systems 102-102" preferably consists of an audio and video playback device 150 such as a computer or video laser disk player having an integrated or a separate keypad 154 coupled thereto. The narrative, described by way of example below, is prerecorded on a laser disk or CD ROM 152 so that selected portions of the narrative can be randomly accessed and replayed when players enter a predetermined access code on the keypad 154. After entering the access code on the keypad 154 (such as a numeric code), a display 156 displays the inputted code and one or more head mounted devices ("HMD") 158, all coupled to the audio/visual playback device 150, provide portions of the prerecorded audio and video narrative to each player. The players themselves, or the guide 140, can input the access codes on the keypad 154.

The HMDs 158 are preferably I-GLASSES!™, produced by Virtual i.O, of Seattle, Washington, which include stereo headphones and visual display devices capable of displaying three-dimensional video to individual players. After developing a script and storyboards, three-dimensional video and stereo audio are preferably prerecorded for the narrative by using a three-dimensional color video camera such as the LK-33 camera produced by Ikegami Electronics, Inc., of Maywood, N. J. The audio and video portions are recorded on magnetic videotape by the LK-33 camera, and the tape is convened to an appropriate format and transferred onto a laser disk, preferably by 3M Corporation of Minnesota, or onto a CD-ROM by another suitable manufacturer. Predetermined access codes are assigned to selected portions of the narrative to allow the selected portions to be replayed, and such codes are recorded with the narrative during the conversion and transfer process from magnetic videotape to the laser disk or CD ROM 152.

The audio/visual playback system 102 can take various forms. For example, rather than employing HMDs 158, the audio/visual playback system 102 can include other display devices, such as one or more CRTs 160 or three-dimensional projection display devices for displaying video portions of the narrative recorded on the laser disk or CD ROM 152, while one or more speakers 162 can play back the audio portions. Rather than employing the keypad 152, other means of accessing portions of the narrative from the audio/visual playback system 102 can be used such as a key activated electronic switch 164 that is activated by a key 166 to permit a selected portion of the narrative to be replayed. Overall, any device for selectively providing audio and/or video portions of the narrative to the players can be employed under the present invention, including audio tape players, videotape players, photographic slide projectors, computers and so forth. Therefore, rather than employing the preferred laser disk or CD ROM 152, the present invention can store the narrative on audio tape, videotape, several photographs, photographic slides, and so forth.

Figure 3:
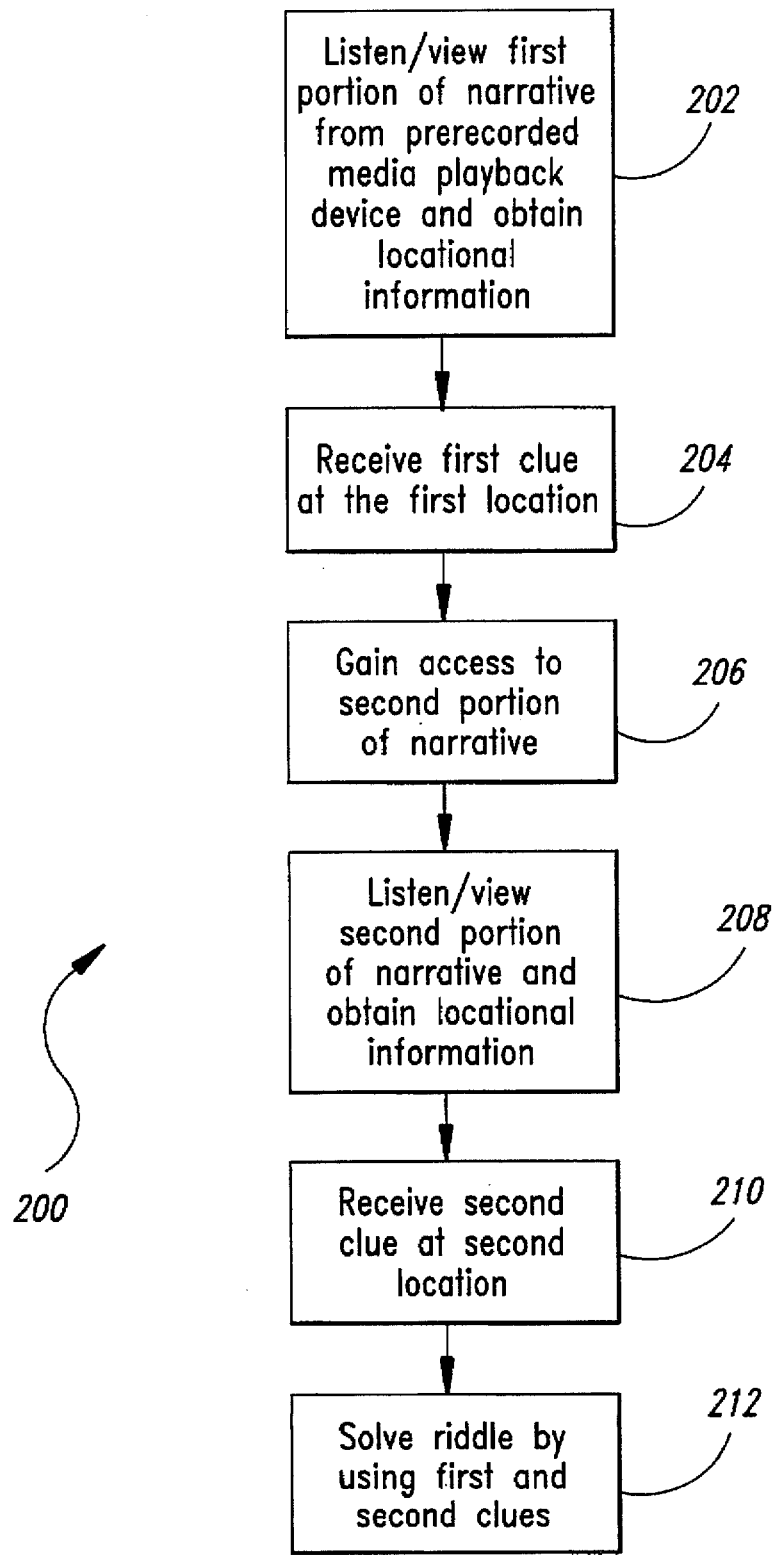
FIG. 3 is a flowchart showing a preferred series basic steps performed under the game system of the present invention.

As shown in the flowchart of FIG. 3, the audio/visual playback system 102 employed by the game system of the present invention forms an important part of the method for playing the game under the present invention. Referring to FIG. 3, a basic method 200 of solving puzzles and obtaining information under the present invention begins in step 202 where one or more players listen and/or view a first portion of the narrative on the HMD 158. The first portion of the narrative, as explained more fully below, preferably provides the player or players with one or more directional clues and/or information fragments that are used to solve a meta-puzzle and/or provide directional information for the location of a puzzle or additional information fragments.

Brief definitions of several terms used herein are helpful. Such definitions, although brief, will help those skilled in the relevant art to more fully understand the present invention based on the detailed description provided herein, but such definitions are to be further defined by the description of the invention as a whole, and not simply by such definitions.

A "puzzle" is a challenge solvable by the players and is either a visual puzzle, a physical trick, or a performer-based puzzle. Correctly solving a puzzle yields a directional clue and/or an information fragment.

A "visual puzzle" includes visual information used by the players to answer or solve a question (e.g., in the form of objects, signage, pictures, etc.). The visual information can consist of one or more pictures, words, or alphanumeric information. A visual puzzle is typically passive or static in that it does not require a physical operation (except, possibly reading and/or writing or drawing). Typical visual puzzles can include: graphic puzzles such as a rebus, hieroglyphs, etc.; text puzzles such as anagrams, word searches, etc.; word riddles; map reading; information research; etc. A visual puzzle can be very simple, such as simply a sign, picture or arrow.

A "physical trick" is a physical device or series of devices that can be properly activated, manipulated, completed or solved by the players. As opposed to visual puzzles, a physical trick-type puzzle must be properly activated and/or operated by the one or more players in order to provide a directional clue and/or information fragment. Physical tricks can be electric, electronic, mechanical or any combination thereof. Physical tricks can include, for example, physical tricks that require the players to split up and be at different locations in the defined space in order to properly operate the physical trick. Physical tricks can also be an activation trick that requires players to determine how to correctly operate a device, or a communication trick that requires players to communicate to each other in order to assemble a correct directional clue and/or information fragment. Physical tricks can also require individual challenges such as climbing, balancing, singing, etc.

A "performer-based puzzle" is a challenge presented to the players by a performer trained or programmed to interact with the players. When the players correctly solve the challenge presented to the players by the performer, the performer preferably yields a clue or information fragment to the players. A performer-based puzzle can be implemented by a human performer, a robot, computer, or other apparatus.

A "directional clue" is a piece of information that directs the team of players to a predetermined location within the defined space 104. Directional clues act as pointers to indicate where the player or players should proceed after solving a given puzzle, viewing a portion of the narrative, etc. The directional clues can relate to the narrative and/or the meta-puzzle. Directional clues can also direct players to locations within a computerized network, such as locations on the Internet.

An "information fragment set" is a collection of information fragments gained from solving a series of puzzles. The series of puzzles can be a consecutive set or "trail" of puzzles. The information fragment set can provide a set of two or more information fragments necessary for solving a meta-puzzle.

A "threshold puzzle" is a puzzle, series of puzzles, or collection of information fragments obtained from solving such puzzles that once solved or obtained yield information, such as a threshold information fragment, necessary for the team to switch from the physical media such as the puzzles to the narrative prerecorded on the audio/visual playback system 102.

"Information fragments" are pieces of information gathered by the players to solve a meta-puzzle. The information fragments are preferably either part of a fixed installation, e.g., a printed sign, or an object that can be felt (or available to the players to take with them in some form (e.g., on paper, cards, as an ink stamp or seal, etc.)). The information fragments can alternatively be delivered through an electronic, photographic or mechanical media, such as an audio message replayed to the players upon correctly solving a puzzle. Information fragments can consist of any of the following: text fragments; individual messages, that, when combined with other images, convey a word or message; image fragments that, when collected and assembled, yield a completed image, audio/visual fragments; etc.

A "meta-puzzle" is a question or challenge solved by the team of players using one or more information fragments obtained by the team.

By providing a global or meta-puzzle solved by solving puzzles and gathering information fragments, the game system of the present invention provides many benefits, such as (i) a robust and adaptable game system usable with a variety of puzzles and/or narrative themes, (ii) a game system that allows for, and requires, players to solve many puzzles, and (iii) an entertaining and challenging game system for a team of players.

Referring back to FIG. 3, the players in step 204 proceed to a first predetermined location based on a directional clue provided by the first portion of the narrative. At the first predetermined location, the team of players receive a first information fragment in an information fragment set, preferably after solving a threshold puzzle. The first information fragment preferably includes, or allows the players to obtain, an access code (e.g., from the guide). In step 206, the players gain access to a second portion of the narrative on the laser disk or CD ROM 152, e.g., by inputting the access code on the keypad 154.

In step 208, one or more players listen and/or view a second portion of the narrative from the laser disk or CD ROM 152 and obtain another directional clue that provides locational information for a second predetermined location. In step 210, the players proceed to the second location and receive a second information fragment in the information fragment set, preferably after solving another puzzle. In step 212, the players solve an overall meta-puzzle by using the first and second information fragments that they have gathered. The meta-puzzle can be initially presented to the players from the first or second portions of the narrative, can be a puzzle related to the content of the narrative, or can be an unrelated puzzle.

Figure 4:
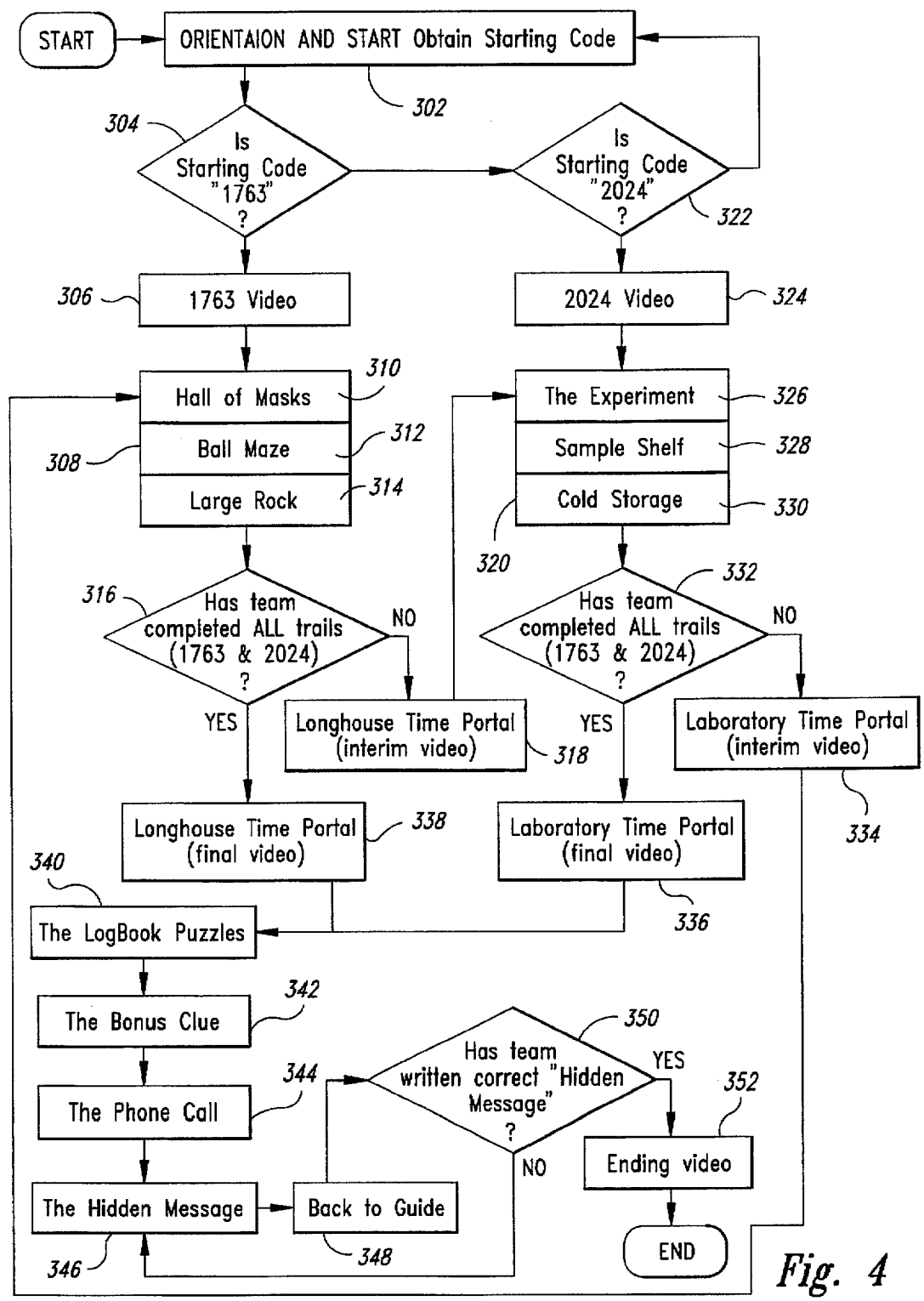
FIG. 4 is a flowchart showing a more detailed series of steps performed under a preferred embodiment of the game system of the present invention.

Referring to FIG. 4, a more detailed method of solving puzzles under the present invention will be described with respect to exemplary puzzles and a narrative that follows a time travel theme. The routine begins in step 302 where the players approach or are greeted by the guide 140 (FIG. 1). The guide 140, either a person or a computer, instructs the players to organize into teams of two to four players each. The guide 140 provides the players with a brief explanation of the game and instructs them on how to operate the audio/visual playback systems 102 through 102". Each team is given an access code such as a four digit code referring to one of two or more time periods presented in the narrative. As shown in FIG. 4, the routine preferably has two or more separate trails or sets of puzzles (consisting of steps 306–316 and 324–332) so that two or more teams can simultaneously play the game without the need to wait for one team to finish before another team begins. Therefore, for two trails, a separate access code is provided to each of two teams. The guide 140 instructs one at least one team to proceed to the audio/visual playback system 102, put on the HMDs 158 and enter the access code on the keypad 154.

In step 304, the audio/visual playback system 102 determines whether the user inputted access code is equal to "1763", and if it is, then in step 306 the system plays back an introductory portion and a first portion of the narrative stored on the laser disk or CD ROM 152. The introductory portion of the narrative depicts a character called "The Time Master," who explains that there has been a serious time disruption that has led to the escape of a vicious criminal named Randolph Serrin. The Time Master explains that Serrin is plotting evil schemes in two different time periods, and that it is up to the team of players to travel to the past and the future to stop Serrin. He explains that the HMDs 158 which the players are wearing are in fact time travel devices, and that Serrin is in possession of such a device. He explains that the players must search their surroundings and follow a trail of clues. He explains that they should record the information fragments they uncover in a log, such as a log 400 (shown in FIG. 5 and described more fully below).

Thereafter, the audio/visual playback device 102 plays back an initial "year 1763" portion of the narrative, which begins with a visual and audio sequence indicating that they have traveled back in time to the year 1763. The players see Randolph Serrin pulling an old boat up onto the shore of a deserted beach. Serrin menacingly muses about enslaving a native population, or killing them, and brandishes a machine gun at the camera (which filmed the scene). He proclaims that he will become their new "God Of Death." While he says this, he pulls out a brightly painted native American mask and shows it to the players. The video freezes on the image of the mask and the following directional clue appears as text which says "Find the Namugwis Mask, follow the clues, and fill in your log book." The video then goes black and the players are given at least one of the logs 400 having spaces in which to fill in information fragments, and a basic map of the defined space 104 within which to search for clues and/or information fragments.

In a first set of information fragments 308, the team of players solves a first set of three puzzles to obtain three information fragments. Therefore, in step 310, the players proceed to a "hall of masks" that includes a visual puzzle consisting of masks 106–109 hanging on a wall in the defined space 104. The map in the log 400 can indicate where the hall of masks is located within the defined space 104. One of the masks 106–109 is the same mask shown in step 306 at the end of the first portion of the narrative. Clues and information fragments are shown through the eye-holes in each mask. Only the correct mask, shown in the narrative, includes the correct first information fragment (e.g., a drawing of a teddy bear). The players record an image of the teddy bear in square "1" of the log book, as shown in FIG. 5. Each of the masks also has a directional clue. Only the correct mask correctly directs the players to the next puzzle.

In step 312, the players must solve a physical trick or ball maze puzzle 110 that consists of a opaque, sealed box approximately three feet square and eight inches deep mounted on a gimbal device (not shown) three feet off of the floor. Inside of the box is a four inch diameter wooden ball with a second information fragment carved into it (e.g., the image of two dice adding up to 11). The ball is free to roll inside the box, and the box includes a simple labyrinth consisting of walls built therein. Players must tilt the box on the gimbal device, using handles 111 extending from the box, so as to move the ball from its starting position to an end point using only a painted diagram of the labyrinth on the box and the sound of the ball rolling inside. The gimbal device to which the box is mounted can be spring loaded to force the box into a preselected position (e.g., approximately perpendicular to the floor). The spring forces of the gimbal device can be of a sufficient force that at least two players are required to move the box, therefore requiring cooperation among the players to solve the puzzle. If successful, the players can view the ball through a small window at the end of the maze, and thereby view the second information fragment. The players copy the second information fragment into the square "2" in the log 400. A directional clue printed on a side of the ball maze puzzle 110 instructs the players to "follow the symbols to the burial mounds."

In step 314, the players must scan the floor of the defined space 104 to locate the visual puzzles or symbol puzzles 112 that direct the players into the room 130. A physical trick or large rock puzzle 114 is positioned against a wall. The rock puzzle 114 is a large, heavy rock (or prop made to resemble a rock) that is pivotally hinged at the floor. One player must tip the rock back toward the wall, while a second player looks under the rock to view a third information fragment (e.g., a picture of a log moving toward a large circular saw). The players copy the picture into square "3" of the log 400. A directional clue underneath the large rock puzzle 114 also instructs the players to return to the guide 140.

In step 316, the guide 140 determines whether the team has successfully completed all of the trails, and thereby obtained all information fragments in the information fragment sets. If not, then the guide determines in step 316 whether the players have successfully collected all of the information fragments in the first information fragment set 308. By successfully collecting all three information fragments in the first information fragment set 308, the players thereby solve a threshold puzzle, and as a result, the guide 140 provides the players with a threshold information fragment or second access code (e.g., the number "2024") and preferably also an additional or bonus information fragment, such as an ink stamp made in validation block 404 of the log 400. In other words, the three puzzles in the first information fragment set 308 form a threshold puzzle, and all three puzzles must be successfully completed and their corresponding information fragments obtained before the team of players regain access to a portion of the narrative stored on the laser disk as CD ROM 152.

In step 318, the players put on the HMDs 158 of the audio/visual playback system 102' and enter the access code "2024" on the keypad 154 to listen to and view a final "year 1763" portion of the narrative recorded on the laser disk or CD ROM 152. The final "year 1763" portion of the narrative shows Serrin fleeing toward his boat on the beach, while his machine gun fails to fire. A gloved hand from behind the camera holds up a clip from Serrins' machine gun, and then holds up a cordless drill. Serrin realizes that his boat is full of holes and that his plans are foiled. He puts on his HMD and disappears.

After a brief visit from The Time Master, the players listen to and view an initial "year 2024" portion of the narrative where the players journey to the year 2024 and see Randolph Serrin inside of the "World Health Organization, Clinical Research Laboratory." Serrin is busy at one of several computer terminals, attempting to hack into the laboratory's computer system. Serrin talks to an accomplice over a small radio that he has almost hacked into the system, and that the information he needs is "hidden in one of the experiments." The video freezes on the image of the "experiment," and the following directional clue, as text, appears: "Find the experiment, follow the clues, and fill in your log book." Thereafter, the players follow a second trail of directional clues and obtain information fragments in a second information fragment set in step 320.

If the team of players were initially given the access code 2024, then the routine in step 304 continues to step 322 and determine if the access code is 2024 (if it is not, then the routine loops back to the orientation step 302, where the players can request help from the guide 140). If the access code is 2024 in step 322, then in step 324, the players listen to and view the introductory portion of the narrative described above in step 306, and the initial "year 2024" portion of the narrative, as explained above in step 318.

In a first step 326, the players must locate the "experiment" puzzle 120, which is a physical trick puzzle consisting of a large monolithic box, approximately two feet by two feet, and eight feet tall. It appears as a physical version of the image of the "experiment" shown in the "year 2024" portion of the narrative. The box is equipped with viewing windows and one or more gloved openings that take the form of a glove 122 affixed to an outer opening of the box and extending inward. The box is filled with several inches of small plastic pellets, slightly below the height of glove 122. Instructions on the experiment puzzle 120 instruct one or more of the players to insert his or her hand into the glove 122 and manipulate the plastic pellets to determine the correct "sample on the shelf." As the players move the pellets away from a bottom portion of the box, a clear window is revealed with a laser projecting a narrow laser beam upward through the box. The laser beam (shown in dashed lines in FIG. 1) travels upward from the box to a mirror and is reflected to impinge on one of four (or more) sample containers in a sample shelf puzzle 124 (described below). Because the curtain 132 obstructs the players' view of the sample shelf puzzle 124, the players must split up so that one player manipulates the plastic pellets in the experiment puzzle 120, while a second player observes the laser beam hitting one of the samples in the sample shelf puzzle 124. Visible underneath the pellets is an information fragment (e.g., a drawing of a jack-in-the-box). The players copy the image of the jack-in-the-box into the square "4" in the log 400.

If the players visually follow the path of the laser beam from the experiment puzzle 120, they will encounter a visual puzzle, the sample shelf puzzle 124. Each of the four or more jars includes various colored liquids, possibly having objects suspended in the liquids. Information fragments are found below each of the jars. The laser beam points to the correct jar, and therefore to the correct information fragment. Players in step 328 copy the correct information fragment (e.g., a recognizable portion of a "7–11" convenience store sign) into square "5" in their log 400. A directional clue adjacent to the correct information fragment directs the players to "Cold storage," which can be indicated on the map in the log 400. The cold storage puzzle 126, a physical trick, is preferably located in the room 132 located beneath the current floor on which the players are located.

In step 330, after the players have located the cold storage problem 126, they are presented with several rows of large test tubes 128 lit from behind, but with no other clues, except for the instruction "To access deep freeze, release coolant" with an arrow pointing upward. The players must again split up. One player must go back up the stairs 136 to a station directly above the cold storage indicated with a sign "coolant release." The player upstairs must then lift upward on a lever 127, that removes a baffle (not shown) from behind one of the test tubes 128, and reveals an information fragment behind the test tube, which another player downstairs in the room 134 can draw into square "6" in the log 400 (e.g., a drawing of a hand wearing a joy buzzer). A directional clue is also revealed that instructs the players to return to the guide 140.

In step 332, the guide 140 determines whether the team has collected all of the correct information fragments in the second information fragment set 320. If the team has collected the three correct information fragments in the second information fragment set 320, and thereby solved a second threshold puzzle, then the guide 140 provides the team with both an access code and a bonus information fragment. Again, the bonus information fragment is preferably an ink stamp provided by the guide 140 in block 406 of the log book 400.

In step 332, the guide 104 also determines whether the team has completed all of the trails of puzzles and thereby collected all three information fragments in each of the information fragment sets 308 and 320. If not, for example, if the team was initially provided with the access code "2024", then the guide 140 provides the team with the "1763" access code. The guide 140 also directs the team of players to the audio/visual playback system 102" into which they must input the access code on the keypad 154.

If the players have not completed all of the trails, then in step 334, the players enter the "1763" access code into the keypad 154 of the audio/visual playback system 102" to view a final "year 2024" portion of the narrative stored on the laser disk or CD ROM 152. The final "year 2024" portion of the narrative shows Serrin in the laboratory as he is about to erase or delete vital medical research data from the computer system at the World Health Organization. Suddenly he notices the camera, and a gloved hand emerges from behind the camera and squirts green liquid onto Serrins' keyboard, thereby foiling his plans. He angers, but then puts on his HMD and disappears. Thereafter, in step 334, the audio/visual playback system 102" replays the initial "year 1763" portion of the narrative.

If the team has successfully completed all of the trails, then in step 336, the players enter a new access code, such as a code indicating the current year or "1995" on the keypad 154 of the audio/visual playback system 102" to view the final "year 2024" portion of the narrative stored on the laser disk or CD ROM 152. Thereafter, the audio/visual playback system 102" replays a penultimate portion of the narrative where players see The Time Master, who congratulates them on a job well done. As he does this, Serrin emerges from nowhere, and points a gun at The Time Master, who helplessly yells "Do something!" to the players. The image freezes and the following text appears on the screen: "Save the Time Master! Find the hidden message, and tell it to the guide."

In step 340, the players must solve one or more meta-puzzles printed in the log 400 based on the information fragments they have gathered and recorded in the squares of their log. The method of the present invention preferably includes a third set of puzzles (not shown) that provides the players with three additional information fragments in a third information fragment set, shown in squares "7" through "9" in the log 400 of FIG. 5. The third set of puzzles can follow a third narrative portion directed to another time period, such as a 1940's, World War II, theme. After successfully solving the third set of puzzles and collecting the three information fragments in squares "7" through "9" in the log 400, the guide 140 preferably provides the team of players with a third bonus information fragment, which is recorded in square 408 of the log book 400, as an ink stamp shown in FIG. 5.

Referring to FIG. 5, the squares "1" through "9" in the log 400 form a three-by-three matrix. Information fragments in each information fragment set 308, 320, and the above-described third information fragment set, are sequentially entered in one of three columns of the log 400 upon successful completion of each trail of puzzles. The log 400 poses the following first meta-puzzle: "What name do the pictures in boxes 1, 4 and 7 share?" Viewing each information fragment across, in a row, the players see that squares 1, 4 and 7, depicting a teddy bear, a jack-in-the-box, and a bobby pin, all relate to men's names, and the mews names all share a common surname "Kennedy," which the players must enter in a box 410. Similarly, the log 400 poses the meta-puzzles: "What do the pictures in boxes 2, 5 and 8 have in common?" and "Each picture in boxes 3, 6, and 9 contain this word." The squares 2, 5 and 8 depict images representing the word "eleven," while the squares 3, 6 and 9 contain the common word "buzz." The words "eleven" and "buzz" are entered in the blocks 412 and 414, respectively, in the log 400.

In step 342, the players must solve a final meta-puzzle based in part on the bonus information fragments recorded in squares 404, 406 and 408. In step 342, the players must discover that the information fragments in squares 404, 406 and 408, when pieced together, instruct the players to call a particular telephone number. Therefore, in step 344, the players must call the given telephone number to receive a final performer-based puzzle in the form of a prerecorded message whose solution is solved based on the words recorded in boxes 410, 412 and 414. For example, the telephone message could state "This is the time master. If you have solved all the puzzles, then you need to know this: the hidden message concerns a famous journey. A world-famous journey. At the end of the journey, what was said at the ladder? What was said on the ladder? This famous quote is the hidden message. Hurry!" (Answer: one small step for man, one giant leap for mankind). The players write the answer to the question in block 416 of the log 400, and in step 348, return to the guide 140 to reveal their answer.

In step 350, the guide 140 determines if their answer in block 416 is correct, and if not, the routine loops back to the step 346, where the players must again attempt to answer the final meta-puzzle. If their answer is correct, then the guide 140 provides the players with a final access code. In step 352, the players enter the final access code on the keypad 154 of the audio/visual playback system 102 to view a final portion of the narrative. The final portion of the narrative depicts Serrin being captured and The Time Master congratulating them on a job well done, and indicating that the time line has been restored.

As is evident from the various, exemplary puzzles described above, the puzzles performed under the information fragment sets 308 and 320 can take a myriad of forms. Physical trick types puzzles challenge the players to manipulate an object to yield a directional clue or information fragment. Such physical tricks can be electric, electronic, mechanical, sensory, structural, or any combination thereof. The physical trick puzzles are preferably self-resetting, such as the rock 114 and the cold storage puzzle 126, whereby after the players release the rock or the lever 127, gravity returns the puzzle into its set position for the next team of players. The ball maze puzzle 110 preferably has walls which form the labyrinth that are extend only halfway from the bottom of the box to its top. As a result, when the box is positioned by the spring-loaded gimbal device to its preselected position, i.e., approximately perpendicular to the floor, the ball is able to roll over the walls so as to automatically fall back to a starting position at a lower end of the box. When the box is positioned by the players to be approximately parallel to the floor, then the walls inside the box inhibit the ball from rolling directly to the end position. As a result, additional individuals are not required to reset puzzles after players have correctly solved them.

Visual puzzles provide the players with a challenge presented by visual information, where the correct solution provides the players with an or information fragment. Such visual puzzles can have a myriad of forms such as one or more objects having visual information formed thereon (e.g., the mask puzzles 106–109).

A combination of visual and physical trick type puzzles can be employed such as a computer that presents the players with a visual-type puzzle, whereby several images displayed by the computer must be selected, or organized in a predetermined order. The players physically input commands into the computer using typical input devices such as mice, keyboards, etc. After correctly solving the puzzle displayed by the computer, the computer in turn can provide the players with directional clues, information fragments and/or access codes. Alternatively, the computer can itself unlock a portion of the narrative, thereby providing the threshold puzzle to the players that allows them to reaccess the prerecorded narrative stored on the laser disk or CD ROM 152.

As noted above, the performer-based puzzle employs a performer, such as a person trained to interact with the players, whereby the performer presents them with a challenge which they must solve. For example, the performer could speak a fictitious language, and the players could be presented with a phrasebook based on the fictitious language. The players must interact with the performer in the fictitious language in order to solve the performer-based puzzle. After the players correctly solve the puzzle presented by the performer, the performer yields the players with a directional clue or information fragment.

The present invention preferably employs puzzles that require cooperation between players on a team, such as the large rock puzzle 114, the experiment puzzle 120 and sample shelf 124, and the cold storage puzzle 126. A more rigorous, exemplary puzzle, that can include both visual puzzles and physical tricks, but which requires superior cooperation between players involves a "trust walk" puzzle employing a communications system having a mobile unit and a console unit. The mobile unit includes a rechargeable power source and a blindfold mask having a video camera with transmitter and a one- or two-way radio communicator mounted thereto. The console unit includes a video receiver, a television monitor, a one- or two-way radio communicator and a recharger for the rechargeable power source. One player is blindfolded and uses the mobile unit while he or she travels through a predetermined course to solve certain puzzles. Another, second player, in another room, sits at the console and views the course transmitted to the console by the video camera worn by the first player. The second player must communicate with the first player over the radio communicator and instruct him or her to perform certain tasks and thereby solve certain puzzles. As a result, the second player at the console becomes the "eyes" of the first player.

The game system, and method of its play, can also take a myriad of forms. For example, rather than employing several trails of puzzles that sequentially provide information fragments in each information fragment set, the system of the present invention can be non-linear so that no predetermined order for collecting the information fragments is required and the players can interact with several puzzles, in any order, to obtain all of the required information fragments. Alternatively, the game system of the present system can require two or more teams to cooperatively interact with each other to solve puzzles, obtain information fragments, and ultimately solve the meta-puzzle. Furthermore, the game system can allow teams to interact competitively, such as by employing a stopwatch whereby the team to solve the meta-puzzle in the shortest amount of time is declared by the guide 140 to be the winner.

Certain features of the game system of the present invention can similarly have a myriad of forms. For example, the game system can be a computer software-type game having the narrative prerecorded on the laser disk or CD ROM 152, and various puzzles. One or more players view the narrative on the laser disk or CD ROM 152, then interact with one of several puzzles. The puzzles can be small enough to be shipped with the laser disk or CD ROM 152 as a boxed game. Additionally, rather than employing the laser disk or CD ROM 152, the narrative and even some puzzles can be provided over a computerized communication network, such as the Internet or subscription On-Line services.

The guide 140 can be a centrally located computer, instead of a person, that interacts with all of the teams of the players, provides them with helpful hints, access codes, information fragments, directional clues and so forth. The log 400, rather than employing a booklet, can be a portable computer or personal digital assistant ("PDA") into which players record and store the information fragments that they obtain in the defined space 102. Similarly, the audio/visual playback systems 102–102" can be portable systems, each worn by one of the players. Of course, the game system can employ a fewer or greater number of puzzles, directional clues, information fragments, etc. A myriad of possible narrative themes can be employed and prerecorded on the laser disk or CD ROM 152. Overall, the game system and method of the present invention provides a robust framework within which to integrate various types of puzzles and narratives to thereby provide players with a constantly variable game that will continue to capture their interest.

While the present invention has been described above in terms of a specific exemplary embodiment, many variations are possible, as will be recognizable by those skilled in the relevant art based on the detailed description provided herein. For example, as noted above, the present invention can be converted to a software or CD ROM computer game based on the detailed description provided herein. The game can include physical puzzles that the player or players must solve after listening to or viewing a portion of the narrative. After solving the physical puzzle, the players obtain an information fragment that allows them to reaccess a new portion of the narrative. As a result, such an alternative embodiment can be played in a players' home. Accordingly, the present invention is not limited by the disclosure, but instead its scope is to be determined by reference to the following claims.

We claim:

1. A method of performing a game by a team of players in a defined space comprising the steps of:
    (a) listening or viewing a first portion of a narrative from a prerecorded storage media;
    (b) obtaining information from the first portion of the narrative that directs the players to a first location in the defined space;
    (c) solving a first puzzle at the first location to receive a first clue and a first information fragment in a first information fragment set, the first clue providing information that directs the players to a second location in the defined space;
    (d) solving a second puzzle at the second location to receive a second clue and a second information fragment in the first information fragment set, the second clue assisting the players in accessing a second portion of the narrative;
    (e) listening or viewing the second portion of the narrative from the prerecorded storage media;
    (f) obtaining information from the second portion of the narrative that directs the players to a third location in the defined space;
    (g) solving a third puzzle at the third location to receive a third clue and a first information fragment in a second information fragment set, the third clue providing information that directs the players to a fourth location in the defined space;
    (h) solving a fourth puzzle at the fourth location to receive a second infomation fragment in the second information fragment set; and
    (i) employing the first and second information fragments from the first and second information fragment sets to solve at least one meta-puzzle.

2. The method of claim 1, further comprising the step of obtaining information from a guide, prior to performing the steps of (a) and (e).

3. The method of claim 1, wherein the step (c) of solving a first puzzle includes the step of physically manipulating an object to a preselected position.

4. The method of claim 1, wherein the step (d) of solving the second puzzle includes the step of viewing visual information formed on several objects in order to solve the second puzzle.

5. A game system usable by a team of at least two players in a defined space to solve a meta-puzzle, the system comprising:
- an information storage and retrieval device containing a narrative, the narrative including at least first and second portions, the first and second portions of the narrative providing first and second clues, respectively;
- a human actuatable switch device coupled to the information storage and retrieval device;
- an output device coupled to the information storage and retrieval device that conveys the first and second portions of the narrative and the first and second clues, respectively, to at least one of the players in response to preselected first and second actuations of the switch device, respectively, the first and second clues providing information that directs the at least one player to first and second locations, respectively, in the defined space;
- a first puzzle solvable by the players at the first location, the solution of the first puzzle providing a first information fragment and a threshold information fragment, the threshold information fragment providing information regarding the second preselected actuation of the switch device to allow the at least one player to access the second portion of the narrative from the information storage and retrieval device; and
- a second puzzle solvable by the players at the second location, the solution of the second puzzle providing a second information fragment, the first and second information fragments being usable by the players for solving a meta-puzzle.

6. The system of claim 5 wherein the first puzzle includes an object physically manipulatable to a preselected position by the at least one player to thereby provide the first information fragment.

7. The system of claim 5 wherein the second puzzle includes at least one object having visual information formed thereon for solving the second puzzle by the at least one player to thereby provide the second information fragment.

8. The system of claim 5, further comprising a log for allowing the players to record representations of the first and second information fragments therein.

9. The system of claim 5, further comprising a log for allowing the players to record representations of the second information fragments therein, the log being a paper booklet, and wherein the switch device is a keypad.

10. The system of claim 5 further comprising a log for allowing the players to record representations of the second information fragments therein, the log being a computer.

11. The system of claim 5 wherein the information storage and retrieval device is a disk player having a disk that includes the narrative recorded thereon.

12. The system of claim 5 wherein the output device is a head mounted display device.

13. The system of claim 5 wherein the first information fragment is an image.

14. The system of claim 5, further comprising a help guide for assisting the players in solving at least the first puzzle.

15. The system of claim 5, further comprising a help guide for assisting players in solving at least the first puzzle, the help guide being a computer.

16. The system of claim 5 wherein the narrative is an audio/visual signal representing audio information and three dimensional video information stored in the information storage and retrieval device.

17. The game system of claim 5, further comprising third and fourth puzzles solvable by the players at third and fourth locations, the solutions of the third and fourth puzzles providing third and fourth formation fragments, the third and fourth information fragments being usable by the players for solving another meta-puzzle.

18. A game system usable by a team of at least two players in a defined space to solve a meta-puzzle, the system comprising:
- an information storage and retrieval device containing a narrative, the narrative including at least first and second portions, the first and second portions of the narrative providing first and third directional clues, respectively;
- a human actuatable switch device coupled to the information storage and retrieval device;
- an output device coupled to the information storage and retrieval device that conveys the first and second portions of the narrative and the first and second directional clues, respectively, to the team in response to preselected first and second actuations of the switch device, respectively, the first and third clues providing information that directs the team to first and third locations, respectively, in the defined space;
- a first information fragment set including
  - a first puzzle solvable by the team at the first location, the solution of the first puzzle providing a second directional clue providing information that directs the team to a second location in the defined space, and
  - a second puzzle solvable by the team at the second location, the solution of the second puzzle providing a first information fragment and a threshold information fragment, the threshold information fragment providing information regarding the second preselected actuation of the switch device to allow the team to access the second portion of the narrative from the information storage and retrieval device;
- a second information fragment set including
  - a third puzzle solvable by the team at the third location, the solution of the third puzzle providing a fourth directional information fragment providing information that directs the team to a fourth location in the defined space, and
  - a fourth puzzle solvable by the team at the fourth location, the solution of the fourth puzzle providing a second information fragment; and
- a meta-puzzle solvable by the players using the first and second information fragments.

19. The game system of claim 18 wherein the human actuatable switch device is a numeric keypad, wherein the second puzzle is a threshold puzzle, and wherein the threshold information fragment is an access code usable by the team to reaccess the narrative on the information storage and retrieval device by using the keypad.

20. The game system of claim 18 wherein the first, second, third and fourth puzzles provide the team with first, second, third and fourth information fragments, respectively, the first, second, third-and fourth information fragments being usable by the team for solving at least one meta-puzzle.

21. The game system of claim 18 wherein the first, second, third and fourth puzzles provide the team with first, second, third and fourth information fragments, respectively, the first, second, third and fourth information fragments being usable by the team for solving at least one meta-puzzle; and the game system further comprising, a log for allowing the players to record the first, second, third and fourth information fragments therein.

22. The system of claim 18 wherein the information storage and retrieval device is a disk player having a disk that includes the narrative prerecorded thereon.

23. The system of claim 18 wherein the first puzzle includes an object physically manipulatable to a preselected position by the team of players to thereby provide the second directional clue.

24. The system of claim 18 wherein the second puzzle includes at least one object having visual information formed thereon for solving the second puzzle by the team of players to thereby provide the first information fragment.

25. The game system of claim 18, further comprising a display, coupled to the information storage and retrieval device, for displaying an access code input by the human actuatable switch device, and wherein the information fragment is the access code.

26. The game system of claim 18 wherein the information storage and retrieval device is a videotape recorder, and wherein the output device is a television.

27. The game system of claim 18 wherein the human actuatable switch device is a key activated electronic switch, and wherein the narrative information fragment is a key for operating the key activated electronic switch.

28. A method of solving a meta-puzzle by a player, the solution of the meta-puzzle requiring at least two information fragments, the method comprising the steps of:

(a) listening or viewing a first portion of a narrative from a prerecorded storage media, the first portion of the narrative providing a first directional clue that directs the player to a first location;

(b) receiving a first information fragment at the first location;

(c) gaining access to a second portion of the narrative;

(d) listening or viewing a second portion of the narrative, the second portion of the narrative providing a second directional clue that directs the player to a second location;

(e) receiving a second information fragment at the second location; and employing the first and second information fragments to solve the meta-puzzle.

* * * * *